United States Patent [19]

Morishita et al.

[11] Patent Number: 4,837,690
[45] Date of Patent: Jun. 6, 1989

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 40,813

[22] Filed: Apr. 21, 1987

[30] Foreign Application Priority Data

Apr. 22, 1986 [JP] Japan .................. 61-95128

[51] Int. Cl.$^4$ .................. B62D 5/04; B60G 17/08
[52] U.S. Cl. .................. 364/424.05; 364/483; 180/142; 180/79.1
[58] Field of Search .................. 364/424, 483, 424.05; 180/79.1, 142, 6.28, 6.48, 6.50; 280/707

[56] References Cited

U.S. PATENT DOCUMENTS 4,624,335 11/1986 Shiraishi et al. .................. 180/79.1
4,653,601 3/1987 Nakamura .................. 180/79.1

FOREIGN PATENT DOCUMENTS 57-22967 2/1982 Japan.
59-50864 3/1984 Japan.

Primary Examiner—Parshotam S. Lall
Assistant Examiner—Ellis B. Ramirez
Attorney, Agent, or Firm—Leydig, Voit & Mayer

[57] ABSTRACT

A motor-driven power steering system for a vehicle capable of preventing abrupt change in the steering motion or torque an operator even when the battery has been suddenly depleted or excessively discharged during travel of the vehicle, thereby avoiding any possible panic resulting from sudden loss of power assist. The motor-driven power steering system comprises a motor connected to be energized by the battery for power assisting steering motion of the operator, an electromagnetic sliding clutch connected to continuously change the power-assisting force transmitted from the motor to steerable road wheels in accordance with the intensity of current supplied thereto from the battery, a torque sensor for detecting operator-induced steering torque, a battery sensor for detecting a condition of charge of the battery, and a control unit connected to control both the voltage imposed on the motor and the current supplied to the electromagnetic sliding clutch such that they are made zero if the battery has been depleted, while on the other hand, at least one of the motor voltage and the clutch current is gradually reduced if the battery is insufficiently charged. An electromagnetic switching clutch may be provided to be switched on when the traveling speed of the vehicle is less than a predetermined level, but switched off when the travelling speed of the vehicle is above the predetermined level or if the battery has been depleted. An alarm device may also be provided for warning the operator of the depletion or insufficient charge of the battery.

7 Claims, 4 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

In the past, a conventional power steering system of this type has hitherto been known in which a motor is supplied with electric power from a battery so as to generate power-assisting force which is transmitted through a speed-reduction gear to a steering shaft by means of a gearing or belting so as to assist the steering operation of the steering wheel induced by an operator.

In such a conventional power steering system, however, there arise the following problem. Namely, if the battery is suddenly exhausted or has discharged below a certain level during travel of the vehicle for some reason, the motor can not be supplied with sufficient electric power so that the assisting power would suddenly be lost, requiring heavier steering effort from the operator and, in an extreme case, causing panic on the part of the operator. Moreover, in such a case, the motor, being connected with the steerable road wheels through the speed-reduction gear, also becomes part of the steering load thereby further increasing the steering effort required by the operator.

SUMMARY OF THE INVENTION

In view of the above, the present invention has the objective of eliminating the above-described problems of the prior art, and has for its main object to provide a novel and improved motor-driven power steering system for a vehicle capable of preventing abrupt change in the steering effort or torque required of the operator even if the battery is suddenly exhausted or excessively discharged during travel of the vehicle, thereby avoiding any possible panic resulting from a sudden loss of assisting power.

In order to achieve the above object, according to the present invention, there is provided a motor-driven power steering system for a vehicle having a steering wheel operatively connected to steer steerable road wheels in response to a steering torque exerted thereon by an operator to the motor-driven power steering system comprising:

a battery connected to a charging means to provide power in the form of voltage and current;

a motor adapted to be energized by the voltage of the battery and operable to transmit a force to said steerable road wheels for power-assisting the steering motion caused by the operator through the steering wheel;

an electromagnetic sliding clutch connected to continuously change the power-assisting force transmitted from the motor to the steerable road wheels in accordance with the current supplied thereto from the battery;

a torque sensor connected to detect operator-induced steering torque resulting from steering force imparted to the steering wheel by the operator to generate an output signal representative thereof;

a vehicle-speed sensor for detecting vehicle speed to generate an output signal representative thereof;

a battery sensor for detecting the condition of charge of the battery to generate an output signal representative of whether or not the charge of the battery is substantially zero or is not maintained at a predetermined level indicating that the battery is insufficiently charged; and a control unit connected to receive output signals from the torque sensor, the vehicle-speed sensor, and the battery sensor for controlling the respective running and switching operations of the motor and the electromagnetic sliding clutch in such a manner that both the voltage imposed on the motor and the current supplied to the electromagnetic sliding clutch are made zero when the output signal of the battery sensor indicates that the battery has substantially zero charge, while on the other hand, at least one of the motor voltage and the clutch current is gradually reduced to decrease the power-assisting force transmitted from the motor toward the steerable road wheels in a gradual manner when the output signal of the battery sensor indicates that the battery is insufficiently charged.

In one embodiment, the control unit comprises:

a steering-torque measuring means connected to receive the output signal of the torque sensor to measure the operator-induced steering torque;

a vehicle-speed measuring means connected to receive the output signal of the vehicle-speed sensor to measure the vehicle speed;

a battery-condition detecting means connected to receive the output signal of the battery sensor to generate an output signal representative of the condition of charge of the battery;

a battery-condition judging means connected to receive the output signal of the battery-condition detecting means for determining whether or not the charge of the battery is substantially zero or is not maintained at a predetermined level indicating that the battery is insufficiently charged;

a motor-voltage determining means for determining the voltage imposed on the motor in such a manner that the motor voltage is proportional to the steering torque measured by the steering-torque measuring means when the charge condition of the battery is normal, whereas the motor voltage is made zero when the battery-condition judging means determines that the charge of the battery is substantially zero and is gradually decreased when the battery-condition judging means determines that the battery is insufficiently charged; and a motor-voltage controlling means for controlling the running operation of the motor in accordance with the voltage determined by the motor-voltage determining means.

In another embodiment, the control unit comprises:

a steering-torque measuring means connected to receive the output signal of the torque sensor to measure the operator-induced steering torque;

a vehicle-speed measuring means connected to receive the output signal of the vehicle-speed sensor to measure the vehicle speed;

a battery-condition detecting means connected to receive the output signal of the battery sensor to generate an output signal representative of the condition of charge of the battery;

a battery-condition judging means connected to receive the output signal of the battery-condition detecting means for determining whether or not the charge of the battery is substantially zero or is not maintained at a predetermined level indicating that the battery is insufficiently charged;

a clutch-current determining means for determining the current supplied to the electromagnetic sliding clutch in such a manner that the clutch current is proportional to the steering torque measured by the steering-torque measuring means when the charge condition of the battery is normal, whereas the clutch current is made zero when the battery-condition judging means determines that the charge of the battery is substantially zero, and is gradually decreased when the battery-condition judging means determines that the battery is insufficiently charged; and a clutch-current controlling means for controlling the switching operation of the electromagnetic sliding clutch in accordance with the current determined by the clutch-current determining means.

In a further embodiment, the control unit comprises:

a steering-torque measuring means connected to receive the output signal of the torque sensor to measure the operator-induced steering torque;

a vehicle-speed measuring means connected to receive the output signal of the vehicle-speed sensor to measure the vehicle speed;

a battery-condition detecting means connected to receive the output signal of the battery sensor to generate an output signal representative of the condition of charge of the battery;

a battery-condition judging means connected to receive the output signal of the battery-condition detecting means for determining whether or not the charge of the battery not maintained at a predetermined level indicating that the battery is substantially zero or insufficiently charged;

a motor-voltage determining means for determining the voltage imposed on the motor in such a manner that the motor voltage is proportional to the steering torque measured by the steering-torque measuring means when the charge condition of said battery is normal operating conditions, whereas the motor voltage is made zero when the battery-condition judging means determines that the charge of the battery is substantially zero, and gradually decreased when the battery-condition judging means determines that the battery is insufficiently charged;

a motor-voltage controlling means for controlling the running operation of the motor in accordance with the voltage determined by the motor-voltage determining means;

a clutch-current determining means for determining the current supplied to the electromagnetic sliding clutch in such a manner that the clutch current is proportional to the steering torque measured by the steering-torque measuring means when the charge condition of the battery is normal, whereas the clutch current is made zero when the battery-condition judging means determines that the charge of the battery is substantially zero, and is gradually decreased when the battery-condition judging means determines that the battery is insufficiently charged; and a clutch-current controlling means for controlling the switching operation of the electromagnetic sliding clutch in accordance with the current determined by the clutch-current determining means.

An electromagnetic switching clutch may be provided to switch the transmission of power-assisting force from the motor toward the steerable road wheels on and off in accordance with the travelling speed of the vehicle. The electromagnetic switching clutch is controlled by a clutch controlling means in such a manner that it is switched on when the travelling speed of the vehicle is less than a predetermined level, but switched off when the travelling speed of the vehicle is above the predetermined level or when the battery-condition judging means determines that the charge of the battery is substantially zero.

An alarm device may be provided to warn the operator of the depletion or insufficient charge of the battery upon the determination by the battery-condition judging means.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 6 relate to a motor-driven power steering system in accordance with the present invention, in which:

FIG. 1 is a schematic view illustrating a general arrangement of the same;

FIG. 2 is a block diagram showing a control unit and its related parts;

FIG. 3 is a graphic representation showing the current/transmitting-torque characteristics of a first electromagnetic clutch;

FIG. 4 is a characteristic view showing a steering-torque/motor-voltage relationship and a steering-torque/first-clutch-current relationship;

FIG. 5 is a characteristic view showing a vehicle-speed/first-clutch-current relationship and a vehicle-speed/second-clutch-voltage relationship; and FIG. 6 is a flow chart showing the control processes of the power steering system of FIG. 1 as controlled by the control unit illustrated in FIG. 2.

DESCRIPTION OF THE PREFERRED EMBODIMENT

The present invention will now be described in detail with reference to a presently preferred embodiment thereof as illustrated in the accompanying drawings.

Figure 1:
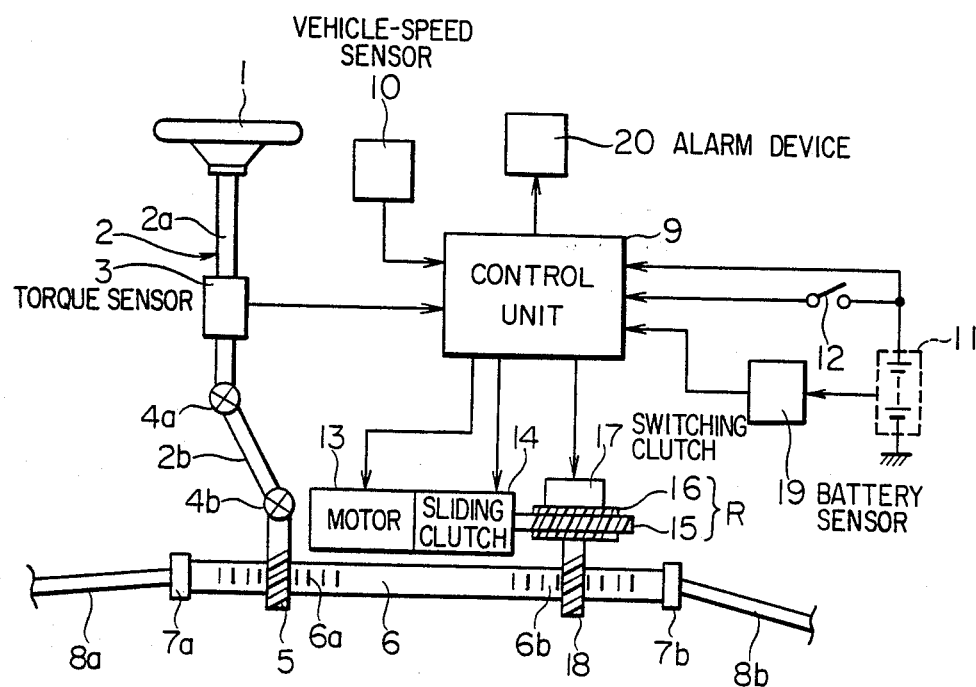

Referring to the drawings and first to FIG. 1, there is shown a general arrangement of a motor-driven power steering system for a vehicle constructed in accordance with the present invention. The motor-driven power steering system illustrated includes a steering wheel 1; a steering shaft 2 fixedly connected at its upper end with the steering wheel for integral rotation therewith; a torque sensor 3 mounted on the steering shaft 2 for detecting operator-induced steering torque resulting from steering force exerted on the steering wheel 1 by an operator to generate an electrical signal representative of the detected steering torque, the steering shaft 2 including an upper section 2a and a lower section 2b joined with each other through a first universal joint 4a; a first pinion 5 operatively connected at its upper end with the the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle-speed sensor 10 for detecting the travelling speed of a vehicle to generate an output signal representative of the detected vehicle speed; a battery 11 mounted on the vehicle and adapted to be charged by a charging means such as an alternator (not shown); a key or ignition switch 12; a second pinion 18 in meshing engagement with the second rack tooth portion 6b on the rack 6; a motor 13 operatively connected through a speed-reduction gear R with the second pinion 18 for power assisting the steering motion of the rack 6 induced by the operator, the motor being preferably in the form of a direct current motor having a shunt winding field or a magnetic field and adapted to be driven to rotate by the battery 11; a first electromagnetic clutch 14 interposed between the motor 13 and the second pinion 18 for transmitting power therebetween substantially in proportion to the current supplied thereto, the first clutch 14 being preferably in the form of an electromagnetic sliding clutch such as, for example, a powder clutch, a hysteresis clutch or the like and directly coupled, in the illustrated embodiment, with an output shaft of the motor 13; a second clutch 17 in the form of an electromagnetic switching clutch interposed between the motor 13 and the second pinion 18 for selectively establishing and disconnecting an operative connection therebetween; a battery sensor 19 for detecting the charging condition of the battery 11 to generate an output signal representative of the detected battery condition; an alarm device connected to alarm the vehicle operator when the battery sensor 19 detects that the charge of the battery 11 is substantially zero or is not maintained at a predetermined level indicating that the battery is insufficiently charged; and a control unit 9 connected to receive output signals from the torque sensor 3, the vehicle-speed sensor 10, and the battery sensor 19 for controlling the operations of the motor 13, the first and second clutches 14 and 17, and the alarm device 20. In the illustrated embodiment, the speed-reduction gear R comprises a worm 15 operatively connected with an output shaft of the first sliding clutch 14, and a worm wheel 16 in mesh with the worm 15. The second electromagnetic switching clutch 17 serves to mechanically couple or disconnect the worm wheel 16 with the second pinion 18.

Figure 2:
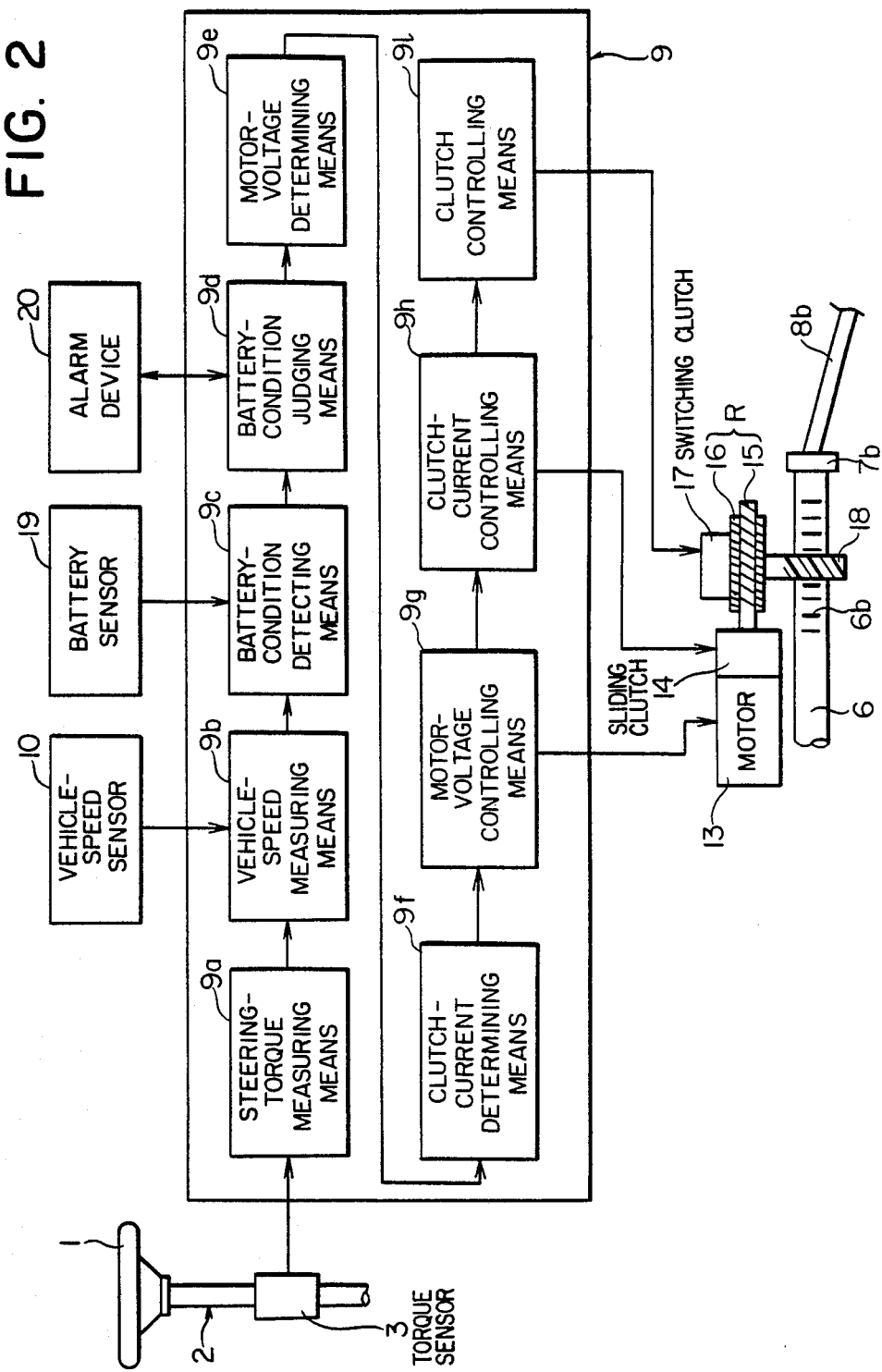

As diagrammaticaly illustrated in FIG. 2, the control unit 9 comprises a steering-torque measuring means 9a adapted to receive an output signal from the torque sensor 3 for measuring the operator-induced steering torque, a vehicle-speed measuring means 9b connected to receive an output signal from the vehicle-speed sensor 10 for measuring the vehicle speed, a battery-condition detecting means 9c connected to receive the output signal of the battery sensor 19 to generate an output signal representative of the condition of charge of the battery 11, a battery-condition judging means 9d connected to receive an output signal from the battery-condition detecting means 9c for determining whether or not the charge of the battery 11 is substantially zero or is not maintained at a predetermined level indicating that the battery is insufficiently charged and generate an output signal so as to operate the alarm device 20 if it is determined that the charge of the battery 11 is not maintained at a predetermined level indicating that the battery is substantially zero or insufficiently charged, a motor-voltage determining means 9e for determining an appropriate voltage imposed on the motor 13 in such a manner that the motor voltage is proportional to the steering torque measured by the steering-torque measuring means 9a when the charge condition of the battery 11 is normal, whereas the clutch current is made zero when the battery-condition judging means 9d determines that the charge of the battery 11 is substantially zero, and is gradually decreased when the battery-condition judging means 9d determines that the charging level of the battery 11 is insufficient, a motor-voltage clutch-current determining means 9f for determining an appropriate clutch current to be supplied to the first electromagnetic sliding clutch 14 in such a manner that the clutch current is proportional to the steering torque measured by the steering-torque measuring means 9a when the charge condition of the battery 11 is normal, whereas the clutch current is made zero when the battery-condition judging means 9d determines that the charge of the battery 11 is substantially zero, and is gradually decreased when the battery-condition judging means 9d determines that the charging level of the battery 11 is insufficient, a motor-voltage controlling means 9g for controlling the running operation of the motor 13 on the basis of the voltage determined by the motor-voltage determining means 9e, a clutch-current controlling means 9h for controlling the switching operation of the first electromagnetic sliding clutch 14 on the basis of the current determined by the clutch-current determining means 9f, and a clutch controlling means 9i for controlling the second electromagnetic switching clutch 17 in such a manner that the electromagnetic switching clutch 17 is switched on when the travelling speed of the vehicle is less than a predetermined reference level, but switched off when the travelling speed of the vehicle is greater than the predetermined reference level or when the battery-condition judging means 9d determines that the charge of the battery 11 is substantially zero.

Now, the operation of the power steering system of this embodiment will be described with reference to FIGS. 3 through 6. First, the case in which a vehicle is stationary or standing still will be considered. In this case, when the key switch 12 is first turned on to start the engine, the electromagnetic clutch 17 is automatically actuated to place the second pinion 18 into mechanical coupling with the worm wheel 16. In this state, when the steering wheel 1 is turned by an operator, the control unit 9 acts to control the respective running and switching operations of the motor 13 and the sliding clutch 14 in the manner as illustrated in FIG. 4 which shows a relationship between steering torque, motor voltage and clutch current. In this regard, it is to be noted that the steering torque as shown in FIG. 4 is an input torque periodically received when controlling the motor 13, or is an average torque when controlling the sliding clutch 14. More specifically, when steering torque increases in the righthand direction to point a in FIG. 4, the motor 13 is turned on and then imposed with 100% voltage at point b. As the steering torque further increases, current begins to flow through the electromagnetic clutch 14 at point c and the current increases logarithmically with respect to an increase in the steering torque, and reaches 100% current at point d. On the other hand, as the steering torque decreases, current flowing through the electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the electromagnetic sliding clutch 14 are controlled in the same manner when the steering torque increases or decreases in the lefthand direction.

Figure 3:
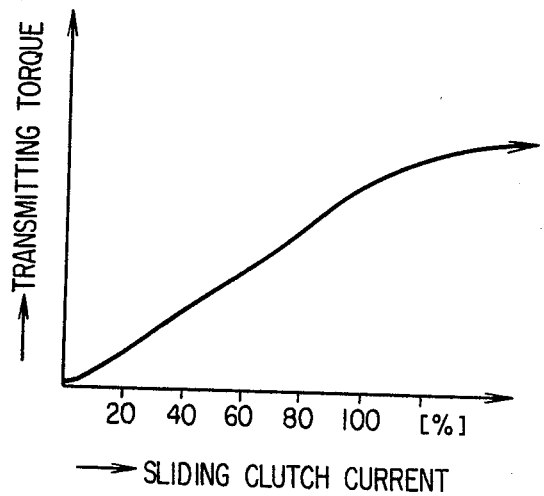
Figure 4:
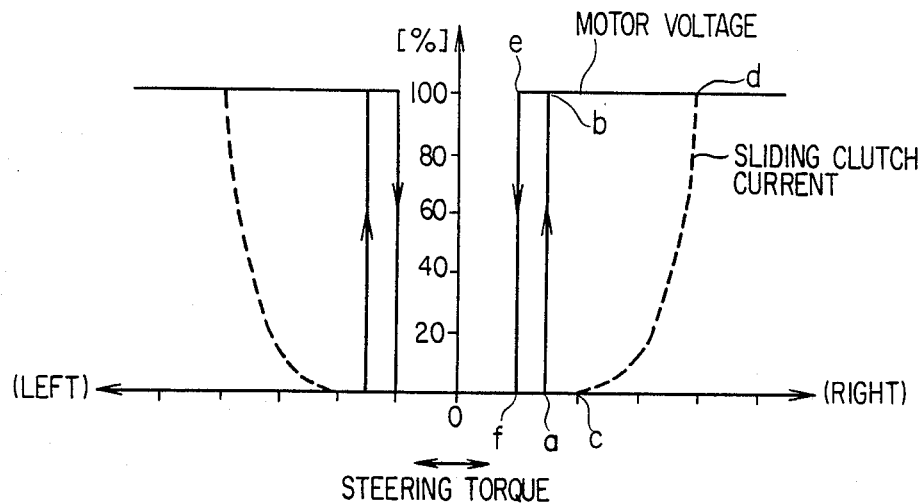
Figure 5:
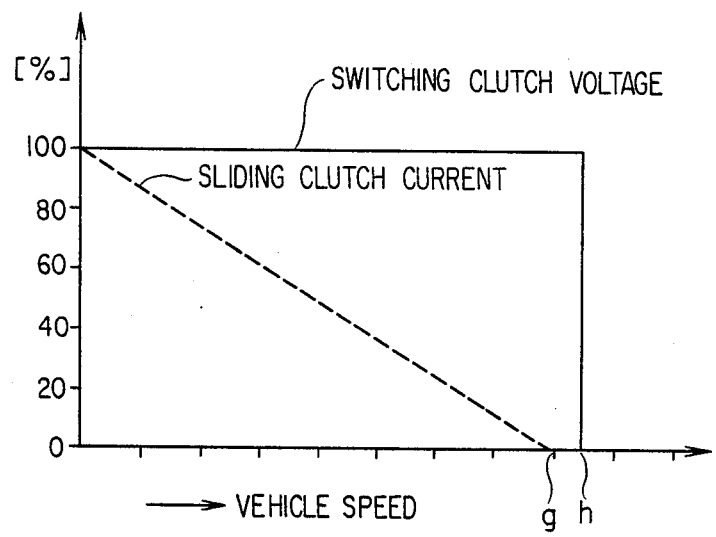

As shown in FIG. 3, the sliding clutch 14 is used in a range in which transmittting torque or sliding torque increases substantially in direct proportion to clutch current. Accordingly, as is clear from FIG. 4, the motor 13 is imposed with 100% voltage and energized to start rotating when steering torque increases to point a. As the steering torque further increases, current flowing through the sliding clutch 14 begins to gradually increase at point c so that the output torque transmitted from the sliding clutch 14 to the worm 15 increases gradually. As a result, auxiliary torque having an intensity corresponding to the turning force imparted to the steering wheel by an operator is transmitted from the motor 13 to the second tooth portion 6b on the rack 6 via the first sliding clutch 14, the worm wheel 16, the second switching clutch 17 and the second pinion 18, thereby lightening the steering operation for the operator.

Now, the case in which the vehicle is travelling will be considered. In this case, as seen from FIG. 5, current flowing through the first sliding clutch 14 is controlled by the control unit 9 so that it decreases in inverse proportion to an increase in vehicle speed. Thus, the sliding clutch current becomes 0% at point g in FIG. 5. That is, even if the steering force is exerted on to the steering wheel 1 by an operator, current flowing through the first sliding clutch 14 becomes zero. On the other hand, when the vehicle speed increases to point h in FIG. 5, the second electromagnetic switching clutch 17 is deactuated or turned off so that the engagement or mechanical coupling between the worm wheel 16 and the second pinion 18 is released or disconnected. As a consequence, when turning the steering wheel 1, the operator only feels a load which is caused by the meshing engagement between the second rack tooth portion 6b and the second pinion 18. In other words, the steering system simply becomes a non-power assisted manual steering. On the contrary, when the vehicle speed decreases, the control unit 9 operates such that the second electromagnetic switching clutch 17 is actuated or turned on at point h to provide mechanical coupling between the second pinion 18 and the worm wheel 16, and then current flowing through the first sliding clutch 14 is gradually increased from point g.

Figure 6:
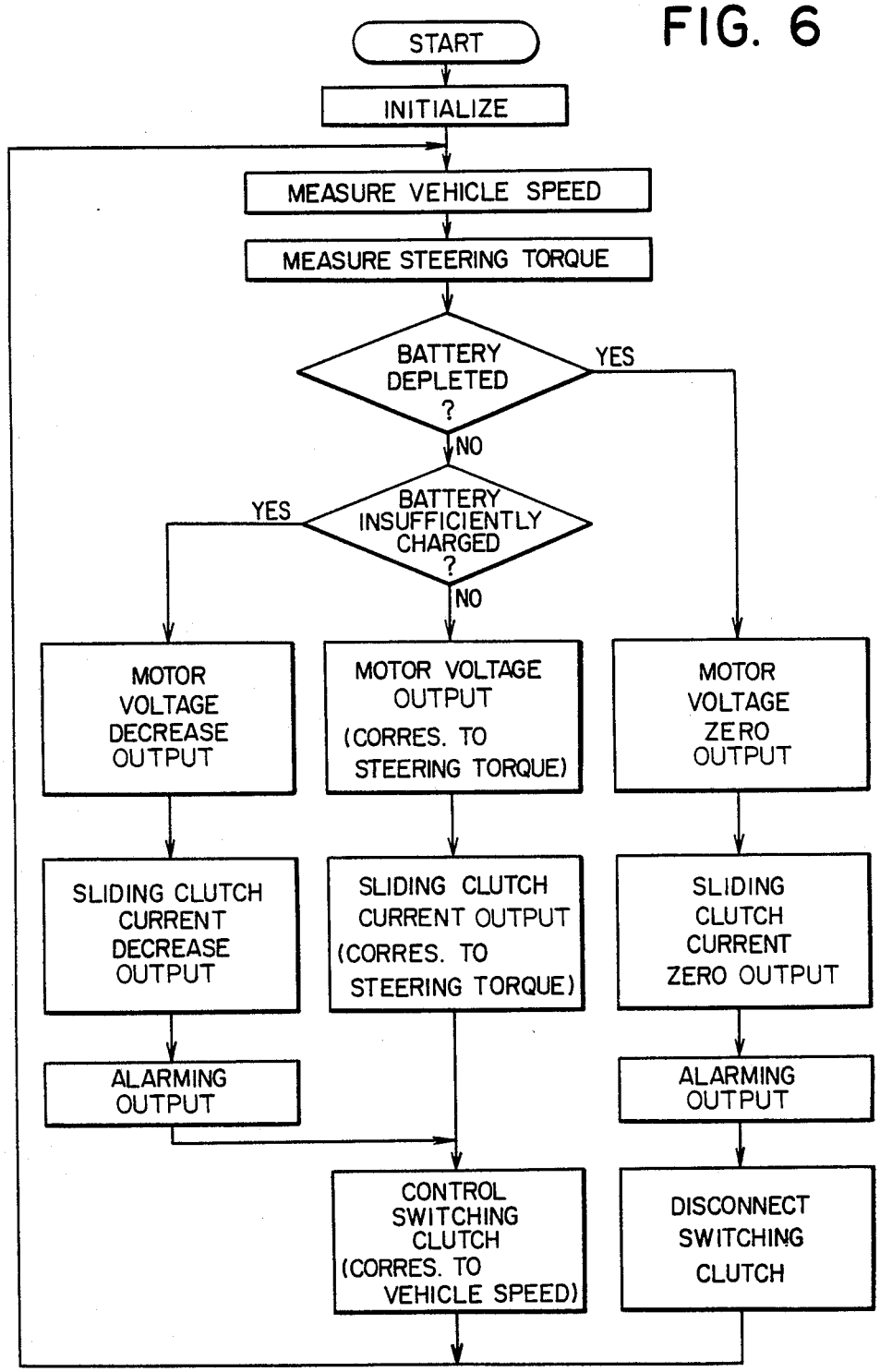

The above description applies to normal operating conditions of the power steering system, but in cases where the charge of the battery 11 is substantially zero or is not maintained at a predetermined level indicating the said battery is insufficiently charged, that is where the level of charge of the battery 11 is zero or less than a prescribed reference value, the control unit 9 operates in the following manner, as illustrated in the flow chart of FIG. 6. Specifically, in this case, the battery sensor 20 acts to detect whether or not the charge of the battery 11 is substantially zero or is not maintained at a predetermined level indicating that the battery is insufficiently charged, by measuring the internal electric resistance of the battery 11, the specific gravity of the electrolyte in the battery 11, or the voltage across the positive and negative terminals of the battery 11. If it is determined by the battery-condition judging means 9d of the control unit 9 that the charge of the battery 11 is substantially zero, the battery-condition judging means 9d operates to control the voltage imposed on the motor 13 and the current supplied to the first sliding clutch 14 in such a manner that the motor voltage and the clutch current are both made zero, and at the same time, the motor-voltage determining means 9e operates to switch off the second switching clutch 17 and actuate the alarm device 20 for warning the operator of the continuous charge-decreasing condition of the battery 11. On the other hand, when the battery 11 has not been depleted but the level of charge thereof is insufficient, the motor-voltage determining means 9e operates the motor-voltage controlling means 9g such that the motor voltage gradually decreases, and at the same time the clutch-current determining means 9f operates the clutch-current controlling means 9h such that the clutch current supplied to the first sliding clutch 14 also gradually decreases, so that the power-assisting force transmitted from the motor 13 toward the steering rack 6 through the first sliding clutch 14 accordingly reduces in a gradual manner. Simultaneously, the alarm device 20 is actuated by the battery-condition judging means 9d for warning the operator of the insufficient charge of the battery 11. In this case, the second switching clutch 17 is switched on.

Although in the above embodiment, the motor voltage to be imposed on the motor 13 and the clutch current to be supplied to the first sliding clutch 14 are simultaneously made zero or decreased when the charge of the battery 11 is substantially zero or is not maintained at a predetermined level indicating that the battery is insufficiently charged, it is possible to control either one of them. Also, the second switching clutch 17, the clutch controlling means 9i and the alarm device 20 may be omitted if desired or necessary.

As described in the foregoing, according to the present invention, there are obtained the following advantages. Specifically, when the key switch is turned on, steering assist is selectively effected or disabled in accordance with battery conditions irrespective of whether or not the engine is started, so that during travel of the vehicle at a speed less than a prescribed level, the steering assist is effective even when the engine stalls or there is a failure of the charging system as long as the battery is not depleted. On the other hand, if the level of charge of the battery becomes insufficient or decreases below a prescribed level, the alarm device is actuated to warn the operator and at the same time, the power assist to the steering system is gradually decreased toward zero until the battery 11 further discharges below a certain level. As a result, it is possible to avoid a situation where the steering effort required by the operator for steering operation abruptly increases or becomes heavier due to sudden loss of the power assist during travel of the vehicle, thereby preventing panic which may result therefrom. In addition, battery condition can be seen from the alarming device so that any trouble or failure of the charging system can be detected.

What is claimed is:
1. A motor-driven power steering system for a vehicle having a steering wheel operatively connected to steer steerable road wheels in response to force exerted thereon by an operator, said motor-driven power steering system comprising:
  a battery connected to a charging means to provide power in the form of voltage and current;
  a motor connected to be energized by the voltage of said battery and operable to transmit a force to said steerable road wheels for power-assisting steering motion caused by the operator through said steering wheel;

an electromagnetic sliding clutch connected to continuously change the power-assisting force transmitted from said motor to said steerable road wheels in accordance with the current supplied thereto from said battery;

a torque sensor connected to detect operator-induced steering torque resulting from steering force exerted on said steering wheel by the operator and generating an output signal representative thereof;

a vehicle-speed sensor connected to detect vehicle speed and generating an output signal representative thereof;

a battery sensor means for detecting the condition of charge of said battery and for generating an output signal representative of whether the charge of said battery is substantially zero or is not maintained at a predetermined level indicating that the battery is insufficiently charged; and a control unit connected to receive output signals from said torque sensor, said vehicle-speed sensor, and said battery sensor and having means for controlling respective running and switching operations of said motor and said electromagnetic sliding clutch in such a manner that both the voltage imposed on said motor and the current supplied to said electromagnetic sliding clutch are made zero when the output signal of said battery sensor means indicates that the charge of said battery is substantially zero, while, on the other hand, at least one of the motor voltage and the clutch current is gradually reduced to decrease the power-assisting force transmitted from said motor toward said steerable road wheels in a gradual manner when the output signal of said battery sensor means indicates that said battery is insufficiently charged.

2. A motor-driven power steering system for a vehicle according to claim 1 wherein said control unit comprises:

a steering-torque measuring means connected to receive the output signal of said torque sensor for measuring the operator-induced steering torque;

a vehicle-speed measuring means connected to receive the output signal of said vehicle-speed sensor for measuring the vehicle speed;

a battery-condition detecting means connected to receive the output signal of said battery sensor means for generating an output signal representative of the condition of charge of said battery;

a battery-condition judging means connected to receive the output signal of said battery-condition detecting means for determining whether the charge of said battery is substantially zero or is not maintained at a predetermined level indicating that the battery is insufficiently charged;

a motor-voltage determining means for determining the voltage imposed on said motor in such a manner that the motor voltage is proportional to the steering torque measured by said steering-torque measuring means when the charge condition of the battery is normal, whereas the motor voltage is made zero when said battery-condition judging means determines that the charge of said battery is substantially zero, and is gradually decreased when said battery-condition judging means determines that said battery is insufficiently charged; and a motor-voltage controlling means for controlling the running operation of said motor in accordance with the voltage determined by said motor-voltage determining means.

3. A motor-driven power steering system for a vehicle according to claim 1 wherein said control unit comprises:

a steering-torque measuring means connected to receive the output signal of said torque sensor for measuring the operator-induced steering torque;

a vehicle-speed measuring means connected to receive the output signal of said vehicle-speed sensor for measuring the vehicle speed;

a battery-condition detecting means connected to receive the output signal of said battery sensor means for measuring an output signal representative of the condition of charge of said battery;

a battery-condition judging means connected to receive the output signal of said battery-condition detecting means for determining whether the charge of said battery is substantially zero or is not maintained at a predetermined level indicating that the battery is insufficiently charged;

a clutch-current determining means for determining the current supplied to said electromagnetic sliding clutch in such a manner that the clutch current is proportional to the steering torque measured by said steering-torque measuring means when the charge condition of the battery is normal, whereas the clutch current is made zero when said battery-condition judging means determines that the charge of said battery is substantially zero, and is gradually decreased when said battery-condition judging means determines that said battery is insufficiently charged; and a clutch-current controlling means for controlling the switching operation of said electromagnetic sliding clutch in accordance with the current determined by said clutch-current determining means.

4. A motor-driven power steering system for a vehicle according to claim 1 wherein said control unit comprises:

a steering-torque measuring means connected to receive the output signal of said torque sensor for measuring the operator-induced steering torque;

a vehicle-speed measuring means connected to receive the output signal of said vehicle-speed sensor for measuring the vehicle speed;

a battery-condition detecting means connected to receive the output signal of said battery sensor for generating an output signal representative of the condition of charge of said battery;

a battery-condition judging means connected to receive the output signal of said battery-condition detecting means for determining whether the charge of said battery is substantially zero or is not maintained at a predetermined level indicating that the battery is insufficiently charged;

a motor-voltage determining means for determining the voltage imposed on said motor in such a manner that the motor voltage is proportional to the steering torque measured by said steering-torque measuring means when the charge condition of the battery is normal, whereas the motor voltage is made zero when said battery-condition judging means determines that the charge of said battery is substantially zero, and is gradually decreased when said battery-condition judging means determines that said battery is insufficiently charged;

a motor-voltage controlling means for controlling the running operation of said motor in accordance with the voltage calculated by said motor-voltage determining means;

a clutch-current determining means for determining the current supplied to said electromagnetic sliding clutch in such a manner that the clutch current is proportional to the steering torque measured by said steering-torque measuring means when the charge condition of the battery is normal, whereas the clutch current is made zero when said battery-condition judging means determines that the charge of said battery is substantially zero, and is gradually decreased when said battery-condition judging means determines that said battery is insufficiently charged; and a clutch-current controlling means for controlling the switching operation of said electromagnetic sliding clutch in accordance with the current determined by said clutch-current determining means.

5. A motor-driven power steering system for a vehicle according to claim 1 further comprising an alarm device connected to warn the operator of the substantially zero or insufficient charge of said battery upon the determination by said battery-condition 6. A motor-driven power steering system for a vehicle according to claim 1 further comprising an electromagnetic switching clutch connected to switch the transmission of power-assisting force from said motor toward said steerable road wheels on and off in accordance with the travelling speed of the vehicle.

7. A motor-driven power steering system for a vehicle according to claim 6 wherein said control unit further comprises a clutch controlling means for controlling said electromagnetic switching clutch in such a manner that said electromagnetic switching clutch is switched on when the travelling speed of the vehicle is less than a predetermined level, but switched off when the travelling speed of the vehicle is above the predetermined level or when said battery-condition judging means determines that the charge of said battery is substantially zero.

* * * * *